United States Patent
Zhang

(10) Patent No.: US 10,225,222 B2
(45) Date of Patent: Mar. 5, 2019

(54) AUTOMATED GENERATION OF PROMPTS AND ANALYSES OF USER RESPONSES TO THE PROMPTS TO DETERMINE AN ENTITY FOR AN ACTION AND PERFORM ONE OR MORE COMPUTING ACTIONS RELATED TO THE ACTION AND THE ENTITY

(71) Applicant: Google Inc., Mountain View, CA (US)

(72) Inventor: Guangqiang Zhang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 72 days.

(21) Appl. No.: 15/607,077

(22) Filed: May 26, 2017

(65) Prior Publication Data

US 2017/0339084 A1    Nov. 23, 2017

Related U.S. Application Data

(63) Continuation of application No. 15/157,027, filed on May 17, 2016, now Pat. No. 9,699,128.

(51) Int. Cl.
| | | |
|---|---|---|
| *G06F 3/048* | (2013.01) | |
| *H04L 12/58* | (2006.01) | |
| *G06F 3/0482* | (2013.01) | |
| *G06F 3/0484* | (2013.01) | |
| *H04L 29/08* | (2006.01) | |
| *G06Q 10/02* | (2012.01) | |

(52) U.S. Cl.
CPC ............ *H04L 51/16* (2013.01); *G06F 3/0482* (2013.01); *G06F 3/0484* (2013.01); *G06Q 10/02* (2013.01); *H04L 51/046* (2013.01); *H04L 51/24* (2013.01); *H04L 67/16* (2013.01)

(58) Field of Classification Search
CPC ...... H04L 65/403; H04L 51/16; G06F 3/0482
USPC ................................. 715/752, 753, 759, 825
See application file for complete search history.

(56) References Cited

U.S. PATENT DOCUMENTS

| | | |
|---|---|---|
| 5,325,310 A | 6/1994 | Johnson et al. |
| 2014/0164509 A1 | 6/2014 | Lynch et al. |

FOREIGN PATENT DOCUMENTS

| | | |
|---|---|---|
| EP | 1699010 | 9/2006 |
| WO | 2013040037 | 3/2013 |

OTHER PUBLICATIONS

International Search Report and Written Opinion of PCT Ser. No. PCT/US16/68645 dated Mar. 10, 2017.

(Continued)

*Primary Examiner* — Andrey Belousov
(74) *Attorney, Agent, or Firm* — Middleton Reutlinger

(57) ABSTRACT

Methods and apparatus directed to utilizing an automated messaging system to engage in a dialog with at least one user, via a computing device of the user, to determine a particular service entity for an action. In some implementations, the automated messaging system may generate a plurality of questions and/or other prompts to solicit user interface input from the user(s) for use in determining the particular service entity and/or in determining one or more criteria for the action. Some implementations are further directed to performing one or more computing actions based on the determined service entity and optionally based on one or more criteria for the action determined via user interface input of the dialog.

17 Claims, 9 Drawing Sheets

(56) References Cited

OTHER PUBLICATIONS

European Patent Office; Written Opinion of the International Preliminary Examining Authority of International Application No. PCT/US2016/068645; dated May 16, 2018.

European Patent Office; International Preliminary Report on Patentability of PCT Ser. No. PCT/US2016/068645, dated Aug. 31, 2018; 22 pages.

AUTOMATED GENERATION OF PROMPTS AND ANALYSES OF USER RESPONSES TO THE PROMPTS TO DETERMINE AN ENTITY FOR AN ACTION AND PERFORM ONE OR MORE COMPUTING ACTIONS RELATED TO THE ACTION AND THE ENTITY

BACKGROUND

Some Internet platforms may enable a user to perform one or more actions associated with a specific service entity. However, the platforms typically require the user to explicitly identify the specific service entity prior to selecting criteria for the one or more actions and/or to make selections of structured options in selecting the criteria for the one or more actions. For example, a user may book a reservation at a particular restaurant by navigating to a web page for that particular restaurant and selecting a time, date, and number of people from drop down user interface menus of the web page. Also, for example, a user may schedule an appointment with a business by navigating to a web page for that business and selecting a time, date, and type of appointment from available options presented in user interface elements of the webpage.

However, these and/or other techniques may suffer from one or more drawbacks. For example, they may require that the user first identify the specific service entity and then provide structured input directed to performance of an action for that specific service entity. Also, for example, they may not enable specification of one or more (e.g., all) criteria of the action to be performed via free-form natural language input by the user. Also, for example, they may utilize fixed structured fields that are not adapted to intent of the user, such as intent determined based on user input in attempting to perform the action and/or intent determined based on past user actions and/or other source(s). Additional and/or alternative drawbacks may be presented.

SUMMARY

Implementations of this specification are directed to utilizing an automated messaging system to engage in a dialog with at least one user, via a computing device of the user, to determine a particular service entity for an action. In some implementations, the system engages in the dialog in response to user interface input that indicates the action but that does not indicate a particular service entity associated with the action. In some of those implementations, the automated messaging system may generate a plurality of questions and/or other prompts to solicit user interface input from the user for use in determining the particular service entity and/or for use in determining one or more criteria for the action. The automated messaging system may generate one or more of the prompts based on, for example, user interface input that occurs during the dialog, stored attributes associated with the user, a protocol that is applicable to all of the candidate entities, and/or a protocol that is specific to a subset of the candidate entities (e.g., specific to the particular service entity).

In various implementations, the system further performs one or more computing actions based on the determined service entity and optionally based on one or more criteria for the action determined via user interface input of the dialog. For example, the system may generate, in one or more computer readable media, a task that is associated with the user, that identifies the action and the determined particular entity, and that includes the determined one or more criteria for the action. The system may optionally communicate the task to one or more other computing systems to initiate performance of the action.

In some implementations, the automated messaging system may generate questions or other prompts during a dialog that solicits particular information from the user and may actively adapt the prompts based on user interface input provided by the user during the dialog. At least some of the prompts generated by the automated messaging system may be natural language prompts and at least some of the user interface input provided by the user during the dialog may be natural language free-form input. As used herein, free-form input is input that is formulated by a user and that is not constrained to a group of options presented for selection by the user. In some implementations, in engaging in the dialog with the user, the automated messaging system may generate one or more prompts based on one or more protocols configured for one or more service entities. For example, the protocols may include "general" protocols that apply to a plurality of service entities that are members of the same class, and "specific" protocols apply to a more narrowly tailored group than the general protocols (e.g., tailored to a subset of the class, such as a specific service entity of the class).

In some implementations, a method performed by one or more processors is provided that includes examining an ongoing message exchange thread between two or more users operating two or more message exchange clients. The method further includes determining, based on the examining, a plurality of candidate service entities that are relevant to one or more terms of the message exchange thread and at least one action associated with the candidate service entities. The method further includes generating a prompt that is tailored to the action and the candidate service entities, and incorporating the prompt into the message exchange thread for presentation to at least one of the users via at least one of the message exchange clients. The method further includes identifying at least one response to the prompt and determining a particular entity of the candidate service entities based on conformance of the particular entity to the response. The response is provided by at least one of the users in the message exchange thread. The method further includes incorporating, based on determining the particular entity, a graphical element into the message exchange thread for presentation to each of the two or more users. The graphical element identifies one or more properties of the particular entity.

These and other implementations of technology disclosed herein may optionally include one or more of the following features.

In some implementations, incorporating the graphical element into the message exchange thread includes requesting that at least one of the message exchange clients insert the graphical element into a transcript of the ongoing message exchange thread that is displayed in a graphical user interface of the at least one of the message exchange clients. In some of those implementations, the graphical element includes text and/or an image.

In some implementations, the method further includes: generating an additional prompt that is tailored to the action and to at least one of the candidate service entities; incorporating the additional prompt into the message exchange thread for presentation to at least one of the users via at least one of the message exchange clients; and identifying at least one additional response to the additional prompt. The additional response is provided by at least one of the users in the message exchange thread. In some versions of those implementations, the method further includes generating, in one or more computer readable media, a task that is: associated with at least one of the users, directed to the action and the particular service entity, and that includes at least a first criterion for the action that is based on the additional response. In some versions of those implementations, the method further includes initiating the action for the particular service entity with at least a first criterion for the action that is based on the additional response.

In some implementations, incorporating the prompt into the message exchange thread includes incorporating the prompt for presentation to each of the users of the message exchange thread.

In some implementations, identifying at least one response to the prompt includes identifying at least a first response to the prompt from a first user of the users and a second response to the prompt from a second user of the users—and determining the particular entity is based on the first response and the second response.

In some implementations, identifying at least one response to the prompt includes identifying a response from each of the users and determining the particular entity is based on each of the responses from the users.

In some implementations, generating the prompt is further based on stored attributes of the users of the message exchange thread.

In some implementations, a method performed by one or more processors is provided that includes receiving first natural language input that is free-form input formulated by a user via a user interface input device of a computing device of the user as part of a dialog between the user and an automated messaging system. The method further includes determining at least one action relevant to the first natural language input and a plurality of candidate service entities for the action. The determined action can be performed by or for the candidate service entities. The method further includes generating a prompt that is tailored to solicit information directed to the action and/or the candidate service entities and providing, in continuance of the dialog, the prompt for presentation to the user via a user interface output device of the computing device of the user. The method further includes receiving, in response to providing the prompt, second input that is responsive to the prompt and that is provided by the user as part of the dialog between the user and the automated messaging system. The method further includes generating, based on the second input, an additional prompt that is tailored to solicit additional information directed the action and/or the candidate service entities and providing, in continuance of the dialog, the additional prompt for presentation to the user via a user interface output device of the computing device of the user. The method further includes receiving, in response to providing the additional prompt, third input that is responsive to the additional prompt and that is provided by the user as part of the dialog between the user and the automated messaging system. The method further includes determining, based on the second input and the third input: one or more criteria for the action; and a particular entity, of the candidate service entities, for which the action is to be performed. The method further includes generating, in one or more computer readable media in response to determining the one or more criteria for the action and the particular entity for which the action is to be performed, a task that: is associated with the user, identifies the action and the particular entity, and includes the one or more criteria for the action.

These and other implementations of technology disclosed herein may optionally include one or more of the following features.

In some implementations, the prompt immediately follows the first natural language input, the second input immediately follows the prompt, the additional prompt immediately follows the second input, and the third input immediately follows the additional prompt.

In some implementations, an intermediary prompt and responsive intermediary input are interposed between the second input and the additional prompt.

In some implementations, generating the prompt is based on a parameter of a general protocol that is applicable to all of the candidate entities for the action. In some of those implementations, the particular entity is determined based on the second input and generating the additional prompt is based on an additional parameter of a specific protocol that is applicable to the particular entity. The additional parameter is not included in the protocol that is applicable to all of the candidate entities for the action.

In some implementations, the second input received in response to the prompt identifies an initial candidate entity of the candidate entities and the method further includes determining that at least one of the criteria for the action is not achievable for the initial candidate entity. In some of those implementations, generating the additional prompt includes incorporating an alias of the particular entity in the additional prompt based on determining that the one or more criteria are achievable for the action for the particular entity.

In some implementations, generating the prompt is further based on a stored attribute of the user. In some of those implementations, the dialog is between the user, the automated messaging system, and an additional user—and generating the prompt is further based on an additional stored attribute of the additional user.

In some implementations, providing the prompt for presentation to the user includes providing the prompt for simultaneous display with the first natural language input via a message exchange client of the computing device of the user. In some of those implementations, the dialog is between the user, the automated messaging system, and an additional user—and the method further comprises providing the prompt for simultaneous display with the first natural language input via an additional message exchange client of an additional computing device of the additional user.

In some implementations, generating the additional prompt is further based on comparison of a property of the particular entity to a current location of the user, a time constraint of the user, and/or a user profile of the user.

In addition, some implementations include one or more processors of one or more computing devices, where the one or more processors are operable to execute instructions stored in associated memory, and where the instructions are configured to cause performance of any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations of this specification are directed to utilizing an automated messaging system to engage in a dialog with at least one user, via a computing device of the user, to determine a particular service entity for an action. The system may engage in the dialog in response to user interface input that indicates the action but that does not indicate a particular service entity associated with the action. In some of those implementations, the automated messaging system may generate a plurality of prompts to solicit user interface input from the user for use in determining the particular service entity and/or for use in determining one or more criteria for the action. In various implementations, the system further performs one or more computing actions based on the determined service entity and optionally based on the one or more criteria for the action determined via user interface input of the dialog.

In some implementations, the automated messaging system may receive vague user interface input generated by the user that is applicable to many service entities and/or that does not specify one or more necessary and/or desired criteria for an action to be performed—and the automated messaging system may engage in a dialog with the user to select a particular service entity for the action and/or to determine one or more criteria for the action. As one example, assume the user initiates a dialog with the automated messaging system by speaking or typing "book a table tonight", "get me reservations at a steak house", or "book a flight to Chicago." In each of those scenarios, the user request may be applicable to many service entities (e.g., the table can be booked at many restaurants, multiple steak houses may be a possibility, and many airlines may offer flights to Chicago) and doesn't specify one or more desired and/or necessary criteria (e.g., number of people, times, dates, which airline). In those implementations, questions generated by the automated messaging system during a dialog with the user may be configured to extract a particular service entity and/or necessary and/or desired criteria from the user, and may be adapted during the dialog based on the user's responses during the dialog.

Figure 1:
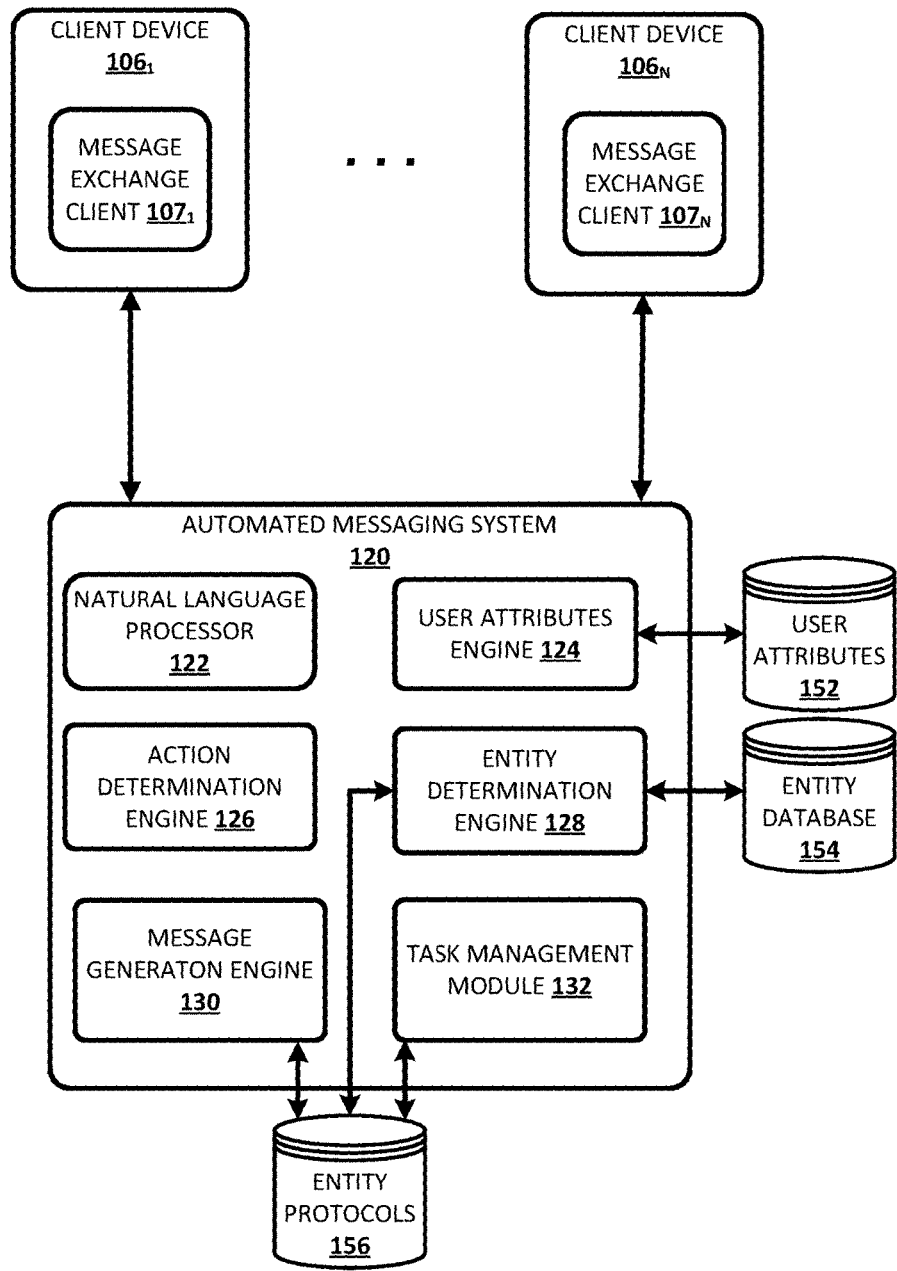
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$ and an automated messaging system 120. Although automated messaging system 120 is illustrated in FIG. 1 as separate from the client computing devices $106_{1-N}$, in some implementations all or aspects of the automated messaging system 120 may be implemented by one or more of the client computing devices $106_{1-N}$. For example, client device $106_1$ may implement one instance or more aspects of automated messaging system 120 and client device $106_N$ may also implement a separate instance of those one or more aspects of automated messaging system 120. In implementations where one or more aspects of automated messaging system 120 are implemented by one or more computing devices remote from client computing devices $106_{1-N}$, the client computing devices $106_{1-N}$ and those aspects of automated messaging system 120 may communicate via one or more networks such as a local area network (LAN) and/or wide area network (WAN) (e.g., the Internet).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Additional and/or alternative client computing devices may be provided. In some implementations, a given user may communicate with automated messaging system 120 utilizing a plurality of client computing devices that collectively form a coordinated "ecosystem" of computing devices. However, for the sake of brevity, examples described in this disclosure will focus on the user operating a single client computing device 106.

Each of the client computing devices $106_{1-N}$ may operate a variety of different applications, such as a corresponding one of the message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated messaging system 120, and so forth. In some implementations, one or more of the message exchange clients $107_{1-N}$ may be implemented via a webpage or other resources rendered by a web browser (not depicted) or other application of client computing device 106.

As described in more detail herein, the automated messaging system 120 engages in dialog with one or more users via user interface input and output devices of one or more client devices $106_{1-N}$ to determine a particular service entity for an action. The automated messaging system 120 may engage in the dialog in response to user interface input that indicates the action but that does not indicate a particular service entity associated with the action. In some implementations, the user interface input is explicitly directed to the automated messaging system 120. For example, one of the message exchange clients $107_{1-N}$ may be a personal assistant messaging service dedicated to conversations with automated messaging system 120 and user interface input provided via that personal assistant messaging service may be automatically provided to automated messaging system 120. Also, for example, the user interface input may be explicitly directed to the automated messaging system 120 in one or more of the message exchange clients $107_{1-N}$ based on particular user interface input that indicates the system 120 is to be invoked. For instance, the particular user interface input may be one or more typed characters (e.g., @AutomatedMessagingSystem), user interaction with a virtual button (e.g., a tap, a long tap), a verbal command (e.g., "Hey Automated Messaging System"), etc. In some implementations, the automated messaging system 120 may engage in a dialog in response to user interface input, even when that user interface input is not explicitly directed to the automated messaging system 120. For example, the automated messaging system 120 may examine the contents of user interface input and engage in a dialog in response to certain terms being present in the user interface input and/or based on other cues.

Each of the client computing devices $106_{1-N}$ and automated messaging system 120 may include one or more memories for storage of data and software applications, one or more processors for accessing data and executing applications, and other components that facilitate communication over a network. The operations performed by one or more of the client computing devices $106_{1-N}$ and/or by the automated messaging system 120 may be distributed across multiple computer systems. Automated messaging system 120 may be implemented as, for example, computer programs running on one or more computers in one or more locations that are coupled to each other through a network.

Automated messaging system 120 may include a natural language processor 122, a user attributes engine 124, an action determination engine 126, an entity determination engine 128, an message generation engine 130, and a task management module 132. In some implementations, one or more of engines 122, 124, 126, 128, 130, and/or module 132 may be omitted. In some implementations, all or aspects of one or more of engines 122, 124, 126, 128, 130, and/or module 132 may be combined. In some implementations, one or more of engines 122, 124, 126, 128, 130, and/or module 132 may be implemented in a component that is separate from automated messaging system 120. For example, one or more of 122, 124, 126, 128, 130, and/or 132, or any operative portion thereof, may be implemented in a component that is executed by of the client computing devices $106_{1-N}$.

Natural language processor 122 processes natural language input generated by users via client computing devices $106_{1-N}$ and generates annotated output for use by one or more other components of the automated messaging system 120. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database (e.g., entity database 154) to resolve a particular entity.

In some implementations, the natural language processor 122 may additionally and/or alternatively include a coreference resolver configured to group, or "cluster," references to the same entity based on one or more contextual cues. For example, the coreference resolver may be utilized to resolve the term "it" to "Asia Village" in the natural language input "I like Asia Village. Book it please."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations. For example, a first user in a message exchange thread may provide input of "I like Asia Village" and a second user may provide responsive input of "Me too. Let's book it". In processing "Me too. Let's book it", the coreference resolver may resolve "it" to "Asia Village" utilizing the prior input of "I like Asia Village".

The user attributes engine 124 determines one or more attributes of at least one user engaged in a dialog with the automated messaging system 120, and provides those attributes to one or more other components of automated messaging system 120. The attributes may be utilized by the other components of the automated messaging system 120, for example, in determining a particular entity for an action, in determining one or more criteria for the action, and/or in generating output for a dialog with the one or more users. The user attributes engine 124 is in communication with a user attributes database 152 that may store one or more user attributes. In various implementations, the user attributes engine 124 and/or user attributes database 152 may be implemented in whole or in part on client computing devices $106_{1-N}$ and/or may determine one or more user attributes based on data provided by client computing devices $106_{1-N}$. Some examples of user attributes that may be determined by user attributes engine 124 include a current location of the user (e.g., based on GPS or other location data), a time constraint of the user (e.g., based on an electronic calendar of the user), and a user profile of the user (e.g., based on user activities across a plurality of Internet services).

The action determination engine 126 utilizes natural language input received from client computing devices $106_{1-N}$ and/or annotations of natural language input provided by natural language processor 122, to determine at least one action related to the natural language input. In some implementations, the action determination engine 126 may determine an action based on one or more terms included in the natural language input. For example, the action determination engine 126 may determine an action based on the action being mapped, in one more computer readable media, to one or more terms included in the natural language input. For instance, an action of "making a restaurant reservation" may be mapped to one or more terms such as "book it", "reserve", "reservation", "get me a table", etc.

In some implementations, the action determination engine 126 may determine an action based at least in part on one or more candidate entities determined by entity determination engine 128. For example, assume natural language input of "book it" and that "book it" is mapped to a plurality of distinct actions such as "making a restaurant reservation", "making a hotel reservation", "making an appointment", etc. In such a situation, the action determination engine 126 may determine which of the actions is the correct action based on candidate entities determined by entity determination engine 128. For example, if entity determination engine 128 determines only a plurality of restaurants as candidate entities, the action determination engine 126 may determine an action of "making a restaurant reservation" is the correct action.

Entity determination engine 128 determines candidate entities based on initial input provided by one or more users via user interface input device(s), and refines those candidate entities in view of further input provided by the user(s) during a dialog between the user(s) and the automated messaging system 120. The entity determination engine 128 utilizes one or more resources in determining candidate entities and/or in refining those candidate entities. For example, the entity determination engine 128 may utilize the natural language input itself, annotations provided by natural language processor 122, user attribute(s) provided by user attributes engine 124, entity database 154, and/or entity protocols from entity protocols database 156.

Entity database 154 may be provided on one or more non-transitory computer readable media and may define a plurality of entities, properties of each of the entities, and optionally relationships between those entities. For example, the entity database may include an identifier of a particular restaurant and one or more properties of that restaurant such as location, cuisine type(s), operating hours, aliases, whether reservations are accepted, a rating of that restaurant, a price indication, etc. The entity database 154 may also include a current state of one or more dynamic properties for an entity, such as current inventory, anticipated inventory for one or more dates and/or times, nearby traffic conditions, etc.

Entity protocols database 156 may be provided on one or more non-transitory computer readable media and defines a plurality of protocols that are each applicable to one or more service entities and/or one or more actions. Each protocol defines one or more necessary and/or desired parameters to perform an associated action and/or to perform the associated action with associated service entity/entities. For example, a first protocol may be a general protocol associated with a restaurant reservation action and associated with all restaurants that take reservations. The first protocol may define necessary parameters such as a date of the reservation, a time of the reservation, and the number of people for the reservation. Also, for example, a second protocol may be a second protocol associated with a restaurant reservation action and associated with a subset of restaurants that take reservations, such as a specific restaurant. The second protocol may define necessary and/or desired parameters such as whether the user desires indoor or outdoor seating, a booth or a table, whether the user has dietary restrictions, etc.

Message generation engine 130 engages in a dialog with one or more user(s), via associated client computing devices, to enable resolution of a particular entity for performing an action and/or resolution of one or more criteria for the particular action. The message generation engine 130 utilizes one or more resources in generating questions or other prompts to solicit information from the user(s). For example, the message generation engine 130 may utilize current and/or past natural language input of the user(s) during the dialog, annotations of that input provided by natural language processor 122, user attribute(s) provided by user attributes engine 124, one or more entities determined by entity determination engine 128, one or more actions determined by action determination engine 126, and/or entity protocols of entity protocols database 156. Message generation engine 130 may include a task management module 132 that determines what criteria have been specified by natural language input provided by a user during a dialog, and stores that criteria in association with the action. The message generation engine 130 may utilize such stored criteria to prevent generation of natural language output that prompts the user to specify any criteria that has already been specified. The task management module 132 may further generate, in one or more computer readable media, a task that is associated with the user, that identifies the action and the determined particular entity, and that includes the determined one or more criteria for the action. The task management module 132 may optionally communicate the task to one or more other computing systems to initiate performance of the action.

Figure 2A:
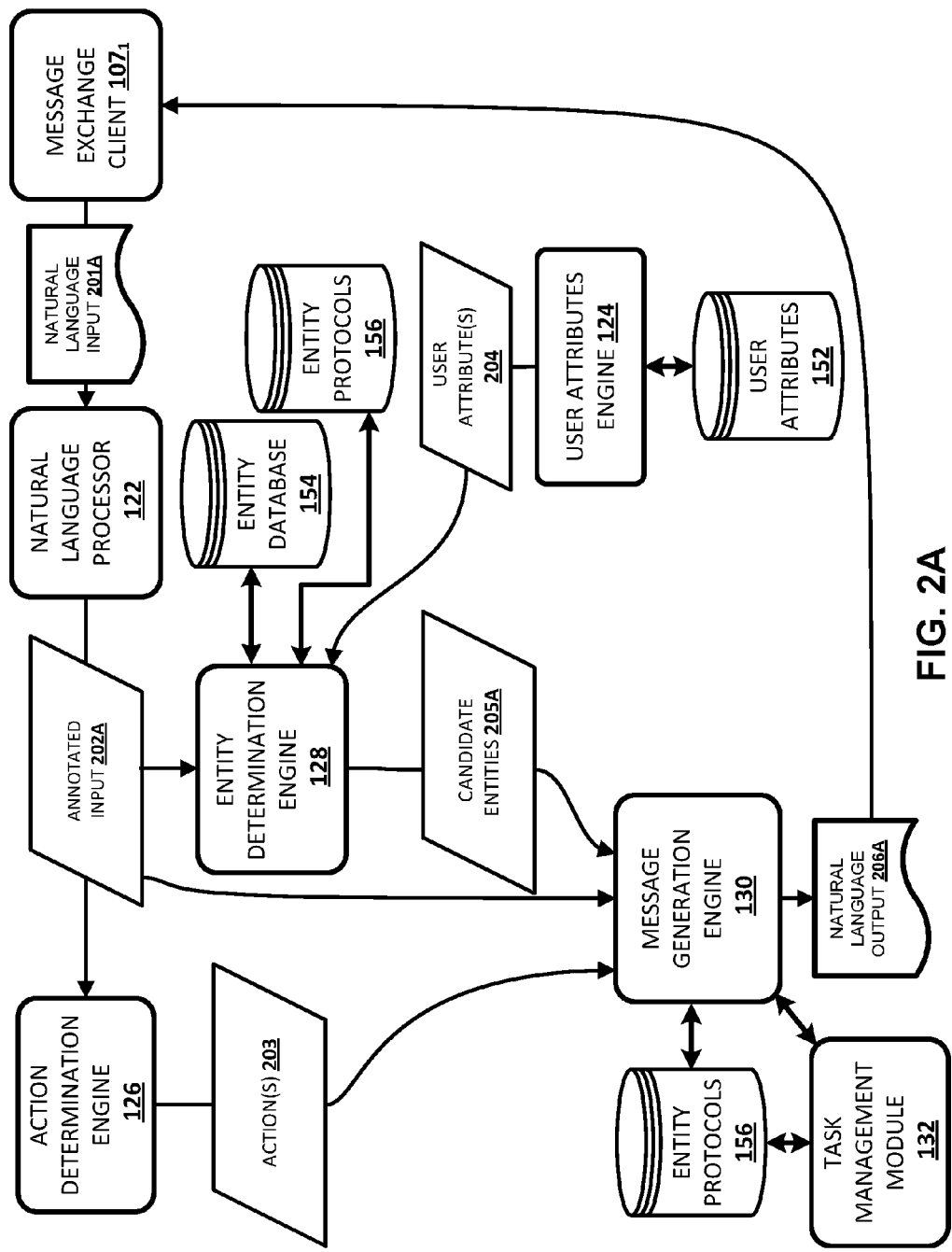
FIGS. 2A and 2B illustrate an example of engaging in a dialog with at least one user, via a computing device of the user, to determine a particular service entity for an action and a plurality of criteria for the action, and performing one or more computing actions based on the determined service entity and the one or more criteria for the action.
Figure 2B:
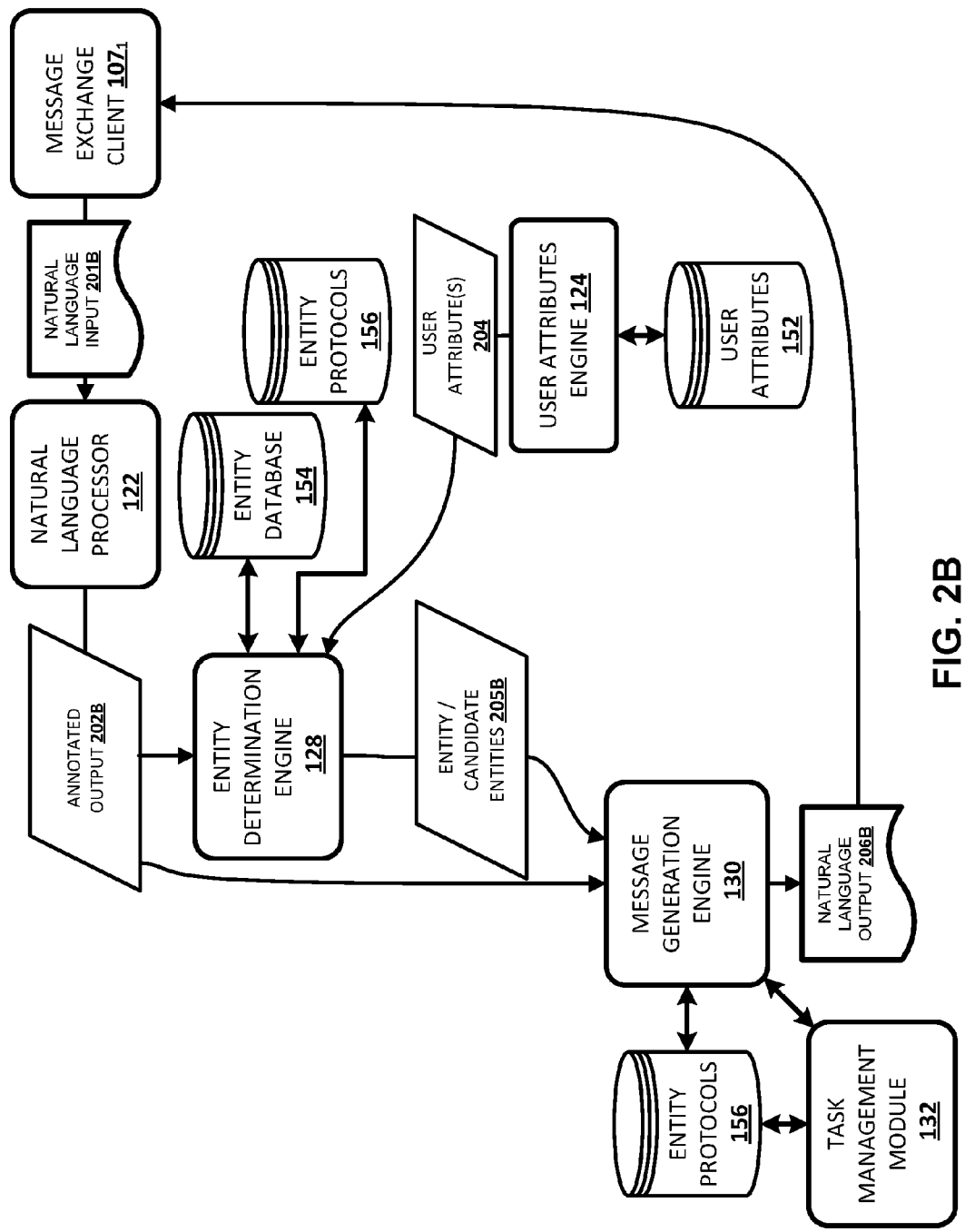
Figure 3A:
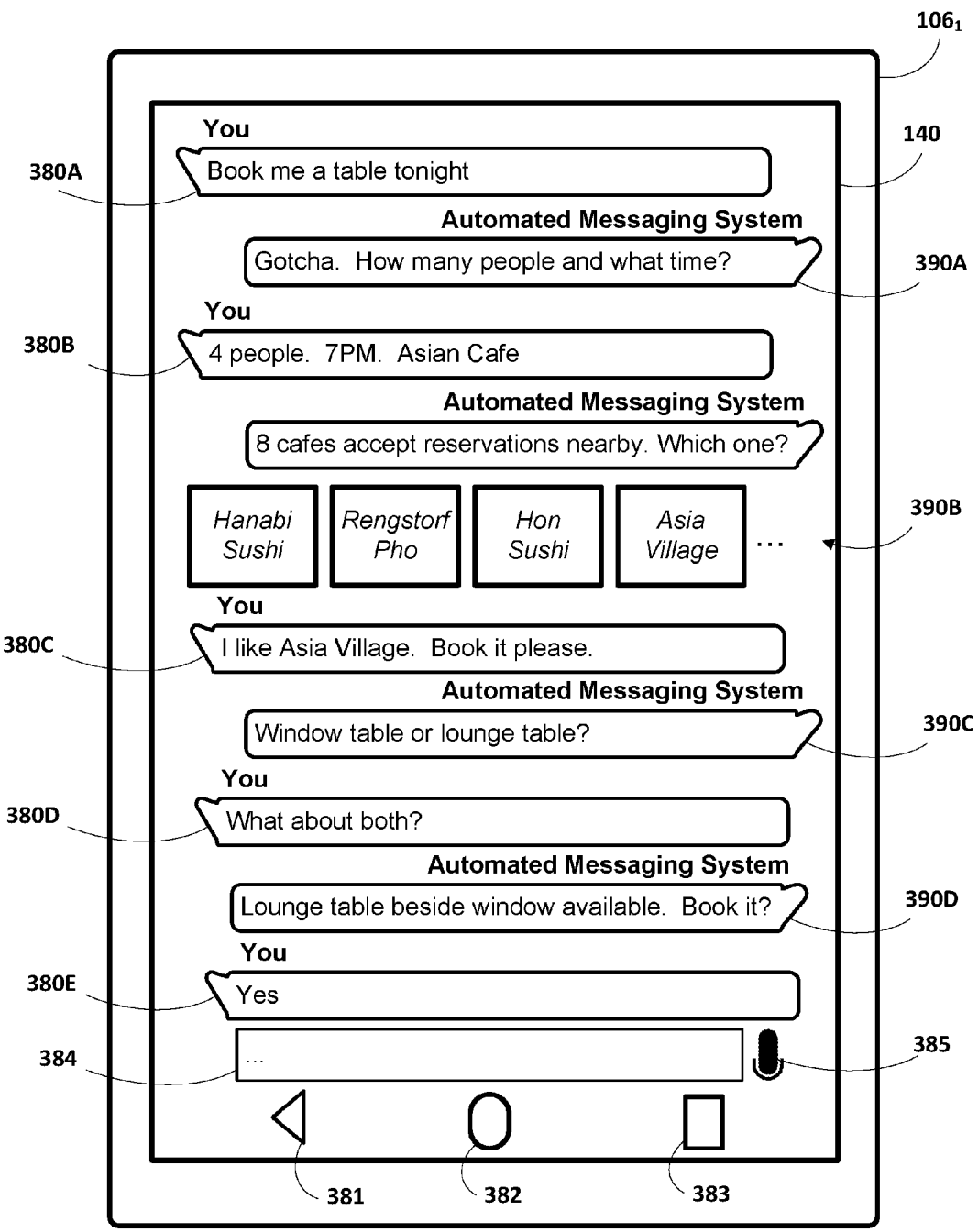
FIG. 3A illustrates an example client computing device with a display screen displaying an example of dialog that may occur between a user of the client computing device and an automated messaging system according to implementations described herein.

Turning now to FIGS. 2A and 2B, additional description is provided of various components of automated messaging system 120 and message exchange client $107_1$. Some description of FIGS. 2A and 2B is provided with examples from FIG. 3A. FIG. 3A illustrates the computing device $106_1$ of FIG. 1 with a display screen 140 displaying an example of dialog that may occur between a user of the client computing device 106₁ and the automated messaging system 120 according to implementations described herein. In particular, the dialog includes user inputs 380A-E and includes prompts 390A-D that may be generated by the automated messaging system 120 according to implementations described herein. The display screen 140 further includes a textual reply interface element 384 that the user may select to generate user input via a virtual keyboard and a voice reply interface element 385 that the user may select to generate user input via a microphone. The display screen 140 also includes system interface elements 381, 382, 383 that may be interacted with by the user to cause the computing device 106₁ to perform one or more actions.

In FIG. 2A, a user utilizes one or more user interface input devices of the computing device 106₁ to provide natural language input 201A to message exchange client 107₁, which transmits the natural language input 201A to natural language processor 122. The natural language input 201A may be free-from input as described herein and may be, for example, typed input provided by the user via a physical or virtual keyboard of a computing device or spoken input provided by the user to a microphone of the computing device. In implementations where the natural language input 201B is spoken input, it may optionally be transcribed to textual input by the computing device and/or by the natural language processor 122.

As one working example, the natural language input 201B may be "Book me a table tonight" as illustrated by user input 380A of FIG. 3A.

The natural language processor 122 processes the natural language input 201A and generates various annotations of the natural language input. The natural language processor provides annotated output (e.g., terms of the natural language input 201A and generated annotations) 202A to action determination engine 126, entity determination engine 128, and message generation engine 130.

Continuing with the working example, the natural language input 201B may be "Book me a table tonight" as illustrated by user input 380A of FIG. 3A, and the natural language processor 122 may annotate "book" as a verb, annotate "table" as a noun, annotate "table" as the object of "book", and annotate "tonight" with a date (i.e., today's date) and/or time range (e.g., from 5:00-12:00 PM). The natural language processor 122 may provide one or more of those terms and/or the annotations as the annotated output 202A.

The action determination engine 126 utilizes the terms and generated annotations of annotated output 202A to determine one or more actions 203 associated with the natural language input 201A. The action determination engine provides the determined actions 203 to the message generation engine 130.

Continuing with the working example, the action determination engine 126 may determine a "making a restaurant reservation" action associated with "Book me a table tonight" based on output from natural language processor 122 indicating "book" as a verb and "table" as the object of "book". Compare this to another example where the natural language input 201A is "I'd like to get a table and a book". In such an example, the natural language processor would annotate "table" and "book" both as nouns, and the action determination engine 126 would not determine a "making a restaurant reservation" action (but may instead determine a "purchase product" action).

The entity determination engine 128 determines one or more candidate entities 205A associated with the natural language input 201A. The entity determination engine 128 provides the determined candidate entities 205A to the message generation engine 130. In some implementations, the entity determination engine 128 utilizes the terms and generated annotations of annotated output 202A to determine the candidate entities 205A. For example, where the input 201A is "reservation at seafood restaurant", the entity determination engine 128 may determine, from entity database 154 and/or other resource, a plurality of candidate service entities that have a "restaurant" property and that have a "seafood" cuisine type property. In some implementations, the entity determination engine 128 may determine the candidate entities 205A based on the action 203 determined by action determination engine 126. For example, for a determined action of "making a reservation", the entity determination engine 128 may determine candidate entities that are restaurants that accept reservations.

In some implementations, the entity determination engine 128 utilizes one or more user attributes 204 determined by user attributes engine 124 in determining candidate entities. For example, user attributes engine 124 may determine, based on user attributes database 152, a user attribute 204 that is a location associated with the user, such as a current location, a work location, a home location, etc. The entity determination engine 128 may utilize the location in determining the candidate entities. For example, the engine 128 may determine candidate entities that are within a threshold distance of the location. Additional and/or alternative user attributes may be utilized by the engine 128 in determining candidate entities, such as user attributes in a user profile of the user, time constraints of the user, etc.

Continuing with the working example, the entity determination engine 128 may determine a plurality of candidate restaurant entities based on natural language input 201A of "Book me a table tonight". For example, the entity determination engine 128 may determine restaurants are associated with the natural language input 201A based on the action 203 determined by action determination engine 126, and may identify, from entity database 154, a plurality of restaurants that are open "tonight" (based on presence of the term "tonight" and/or a corresponding time annotation provided by natural language processor 122) and that are accepting reservations for "tonight." The entity determination engine 128 may further determine those restaurants based on them being within a threshold distance of a user location user attribute 204 provided by user attributes engine 124.

The message generation engine 130 utilizes the actions 203, the candidate entities 205A, the terms and annotations 202, and/or an entity protocol from entity protocols database 156 to generate natural language output 206A. The natural language output 206A is a prompt to solicit user interface input from the user for use in determining the particular service entity and/or in determining one or more criteria for the action. The natural language output 206A is provided to the message exchange client 107₁ for audible and/or visual presentation to the user via a user interface output device of the client computing device 106₁.

In some implementations, the message generation engine 130 utilizes the action 203 and/or the candidate entities 205A to determine an entity protocol for utilization in generating an automated message. For example, for a making a restaurant reservation action for restaurant candidate entities, the engine 130 may identify a general entity protocol that is applicable to all restaurants for making reservations. The general entity protocol may be identified based on it being assigned to the "making a restaurant reservation" action and/or to "restaurant" entities in the entity protocols database 156. The general entity protocol may define one or more necessary and/or desired parameters to perform an associated action such as: a date of the reservation, a time of the reservation, and the number of people for the reservation. The engine 130 may generate the natural language output 206A to solicit information regarding one or more of those parameters and/or to solicit information to enable determination of a particular service entity for performance of the action (it is noted that in many situations one or more of those parameters may also enable determination of a particular service entity). In some implementations, one or more of the parameters of the general entity protocol and/or other protocols may include or otherwise indicate text for inclusion in prompts for those parameters. For example, a parameter related to a number of people for the reservation may include text such as "for how many" or "how many people".

In some implementations, the message generation engine 130 includes a task management module 132 that determines what criteria, if any, for an action are specified by the natural language input 201A, and stores that criteria in association with the action. For example, for "Book me a table tonight", the module 132 may determine a current date based on presence of the term "tonight" (and/or based on an annotation from natural language processor 122), and store the current date as a criteria of the action. The message generation engine 130 may utilize such a stored criteria to prevent generation of natural language output 206A that prompts the user to specify that criteria again (e.g., to prevent asking "what day would you like the reservation?"). For example, where the message generation engine 130 utilizes a protocol that defines parameters that include a parameter for "date of the reservation", the module 132 may assign a current date determined based on user interface input to a corresponding parameter of the protocol. Based on the assignment, that parameter may be ignored by the engine 130 and a prompt generated based on other parameters instead.

Continuing with the working example, in response to received natural language input 201A of "Book me a table tonight", the message generation engine 130 may generate a prompt of "Gotcha. How many people and what time?" In some implementations, the engine 130 may generate the prompt based on a general protocol applicable to a plurality of restaurants that accept reservations. For example, the general protocol may define parameters of "a date of the reservation, a time of the reservation, and the number of people for the reservation" and may be identified by the engine 130 based on it being associated with the action 203 and/or the candidate entities 205A. Further, the engine 130 may include "How many people" in the prompt based on the "number of people" parameter and may have included "what time" based on the "time of the reservation" parameter. The engine 130 may not include anything related to the "date of the reservation parameter" (e.g., "what day", "for tonight?") based on criterion for that parameter being specified by the natural language input 201A (i.e., tonight).

Turning now to FIG. 2B, the message exchange client $107_1$ provides further natural language input 201B that is generated by the user in response to the natural language output 206A provided in FIG. 2A. For example, the user may utilize one or more user interface input devices of the computing device $106_1$ to provide the natural language input 201B to message exchange client $107_1$, which transmits the natural language input 201B to natural language processor 122.

Continuing with the working example, the natural language input 201B may be "4 people. 7PM. Asian Cafe" as illustrated by user input 380B of FIG. 3A.

The natural language processor 122 processes the natural language input 201A and generates various annotations of the natural language input. The natural language processor provides annotated output 202B to entity determination engine 128 and message generation engine 130.

Continuing with the working example, the natural language input 201B may be "4 people. 7PM. Asian Cafe" as illustrated by user input 380B of FIG. 3A, and the natural language processor 122 may annotate "4" as a quantity, annotate "7PM" as a time, and annotate "Asian Cafe" as a named entity (e.g., a class of entities). The natural language processor 122 may provide one or more of those terms and/or the annotations as the annotated output 202B.

The entity determination engine 128 refines the previously determined candidate entities 205A based on the natural language input 201B, and determines a particular entity or a refined set of candidate entities 205B. The entity determination engine 128 provides the determined particular entity or refined set of candidate entities 205B to the message generation engine 130. In some implementations where a refined set of candidate entities is provided, the entity determination engine 128 may optionally rank the candidate entities of the set based on one or more criteria. For example, they may be ranked based on overall ratings, ratings assigned by the user, conformance to preferences of the user (e.g., as provided by user attributes engine 124), distance to a location of the user (e.g., as provided by user attributes engine 124), etc.

Continuing with the working example, the entity determination engine 128 may refine the previously determined candidate entities based on natural language input 201B that includes "4 people. 7PM. Asian Cafe". For example, the entity determination engine 128 may determine a subset of the previously determined candidate entities based on the entities of the subset also being associated with a property of "Asian cuisine", "Cafe", or "Asian Cafe" in entity database 154. Also, for example, the entity determination engine 128 may determine a subset of the previously determined candidate entities based on the entities of the subset also being associated with an inventory (e.g., in entity database 154) that enables reservations for four people at 7:00 PM.

The message generation engine 130 utilizes the particular entity and/or the refined candidate entities 205B and/or an entity protocol from entity protocols database 156 to generate natural language output 206B. The natural language output 206B is provided to the message exchange client $107_1$ for audible and/or visual presentation to the user via a user interface output device of the client computing device $106_1$.

Continuing with the working example, where a plurality of refined candidate entities are provided by the entity determination engine 128, the natural language output 206B may present the user with the prompt 390B of FIG. 3A that prompts the user to select from the refined candidate entities ("8 Cafes . . . Which one?") and presents graphical elements that show properties (aliases/names) of four of those refined candidate entities with an option (". . . ") to see the other four. The display order of presentation of the graphical elements may be based on the optional ranking of the corresponding entities provided by the entity determination engine 128. A user may select one of the candidate entities through interaction with its corresponding graphical element (e.g., by tapping the graphical element) and/or by further natural language input, such as "I like Asia Village" illustrated in user input 380C of FIG. 3A.

Continuing with the working example, assume the entity determination engine 128 has determined a particular entity and provided the particular entity to the message generation engine 130. For example, assume that another instance of the example of FIG. 2B occurs after the user has provided user input 380C of FIG. 3A that indicates "Asia Village" is the particular entity. In some of those implementations, the engine 130 may identify, from entity protocols database 156, a specific protocol applicable to the particular entity. The message generation engine may generate natural language output 206B to solicit criteria for one or more additional parameters of that protocol that have not already been determined by the task management module 132. For example, the specific protocol may define parameters indicative of "whether to reserve a window table and whether to reserve a lounge table". Based on those parameters of the specific protocol, the engine 130 may generate natural language output 206B of "Window table or lounge table?" as illustrated by prompt 390C of FIG. 3A.

As illustrated by user inputs 380D and prompt 390D of FIG. 3A, the automated messaging system 120 may engage in yet further dialog to resolve criteria for the "whether to reserve a window table and whether to reserve a lounge table" parameters of the specific protocol. At prompt 390D the automated messaging system 120 may include the text "book it" based on determining that criteria have been determined for all of the parameters of the general protocol and the specific protocol, and that the action may be completed. In response to the affirmative user input 380E of "yes", the task management module 132 may generate a task that is associated with the user, identifies the determined action and the particular entity, and that includes the determined criteria for the action. In some implementations, the task management module 132 may communicate the task to one or more other computing systems to initiate performance of the action by those computing systems and/or by one or more humans receiving user interface output from those computing systems.

Figure 3B:
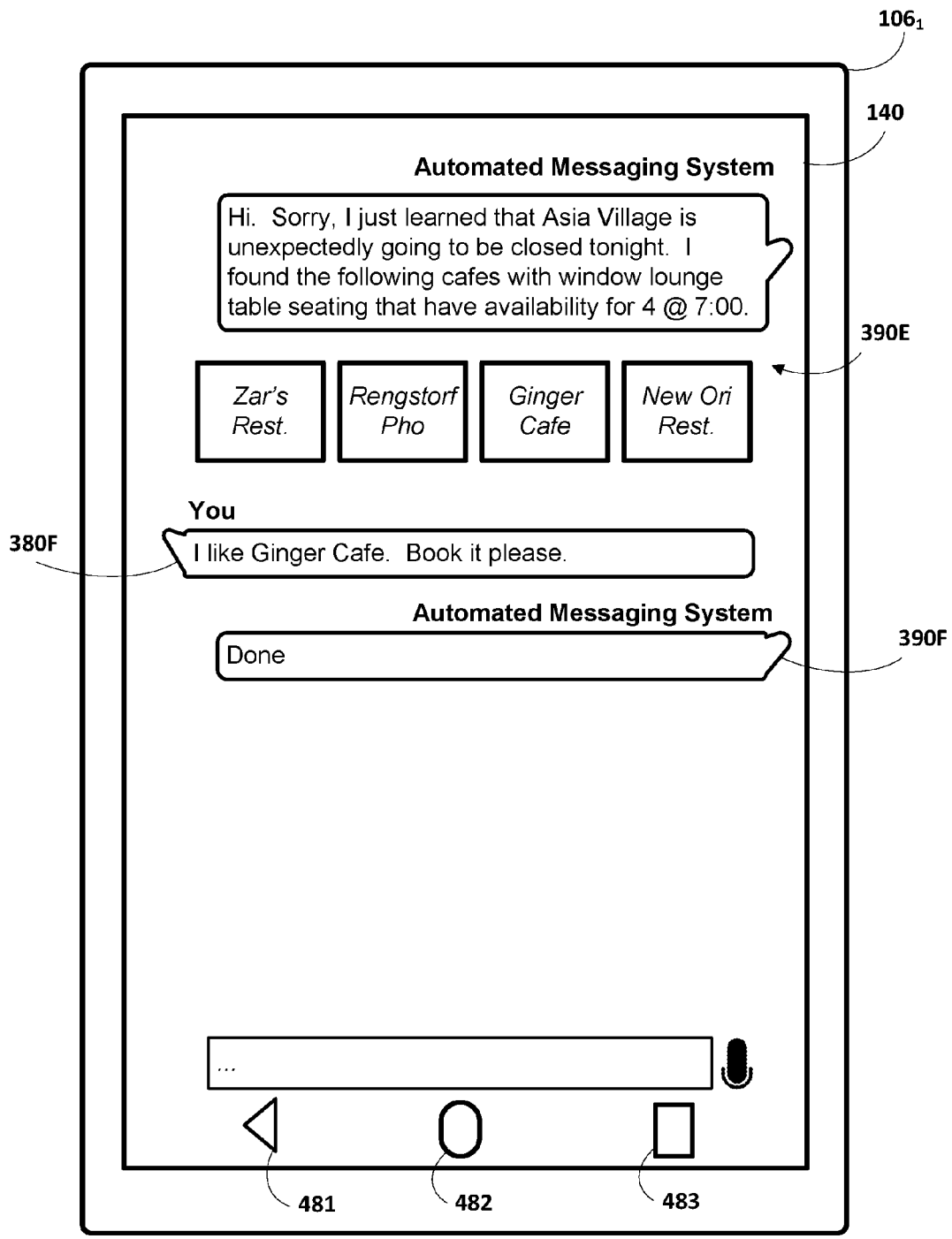
FIG. 3B illustrates the example client computing device of FIG. 3A, with a display screen displaying another example of dialog that may occur between a user of the client computing device and an automated messaging system according to implementations described herein.

FIG. 3B illustrates the computing device 106₁ of FIG. 1 with a display screen 140 displaying another example of dialog that may occur between a user of the client computing device 106₁ and the automated messaging system 120 according to implementations described herein. In particular, FIG. 3B illustrates an example of dialog that is initiated by the automated messaging system 120 and that occurs subsequent to the dialog of FIG. 3A. The dialog of FIG. 3B is initiated by the automated messaging system 120 in response to the system 120 determining that the task specified by the user via the dialog of FIG. 3A cannot be completed. For example, the automated messaging system 120 may determine that at least one of the criteria for the action is not achievable for the particular candidate entity specified by the dialog of FIG. 3A. The determination may be based on attempting to book the reservation via communication with one or more other computing systems and receiving a failure message in response and/or based on separate communications received from a human user associated with the particular service entity.

In FIG. 3B, the automated messaging system 120 initiates the dialog with a prompt 390E that includes: an explanation of why the task specified by the user via the dialog of FIG. 3A cannot be completed, an indication that reservations at other restaurants can be booked for the same action with the same criteria specified in FIG. 3A, and includes graphical elements that show properties (aliases/names) of those other restaurants. In determining the other restaurants for including in the prompt 390E, the automated messaging system 120 may verify that the restaurant reservation action can be performed for those other restaurants with the criteria specified via the dialog of FIG. 3A. The automated messaging system 120 may utilize the entity database 154 and/or entity protocols database 156 in making such a determination. For example, the system 120 may utilize protocols, of database 156, for those other restaurants to verify that they include one or more parameters for a "lounge table" and "window table". Moreover, the system 120 may optionally utilize entity database 154 to determine the other restaurants have availability. The automated messaging system 120 may also optionally utilize user attributes provide by user attributes engine 124 to select the other restaurants based on one or more attributes of the user and/or to rank the other restaurants based on the attributes of the user (which may influence their display order in FIG. 3B).

In response to the prompt 390E, the user continues the dialog by providing user input 380F that specifies one of the other entities presented in prompt 390E ("Ginger Cafe") and specifies that the user would like to take the action with respect to that entity ("Book it please."). In other implementations, the user may continue the dialog by selecting (e.g., tapping) the graphical element of prompt 390E that corresponds to "Ginger Cafe" instead of providing the natural language user interface input 380F.

In response to the user interface input 380F, the automated messaging system 120 may create a new task for making the reservation for the "Ginger Cafe" entity, with the criteria specified in FIG. 3A. The automated messaging system 120 may further communicate with one or more other computing systems to achieve that task and provides a further output 390F indicating to the user that the task has been completed.

FIGS. 3A and 3B, and other examples herein, illustrate a graphical user interface for engaging in a dialog with a user. However, in some implementations the prompts provided by automated messaging system 120 may be conveyed to the user audibly (via speaker(s) of the computing device of the user) without necessarily displaying those prompts. Moreover, in some version of those implementations the user input may be provided via the user providing verbal user interface input. As one particular example, in some implementations a user may engage in a dialog with the automated messaging system utilizing a computing device that does not include any display.

Figure 4:
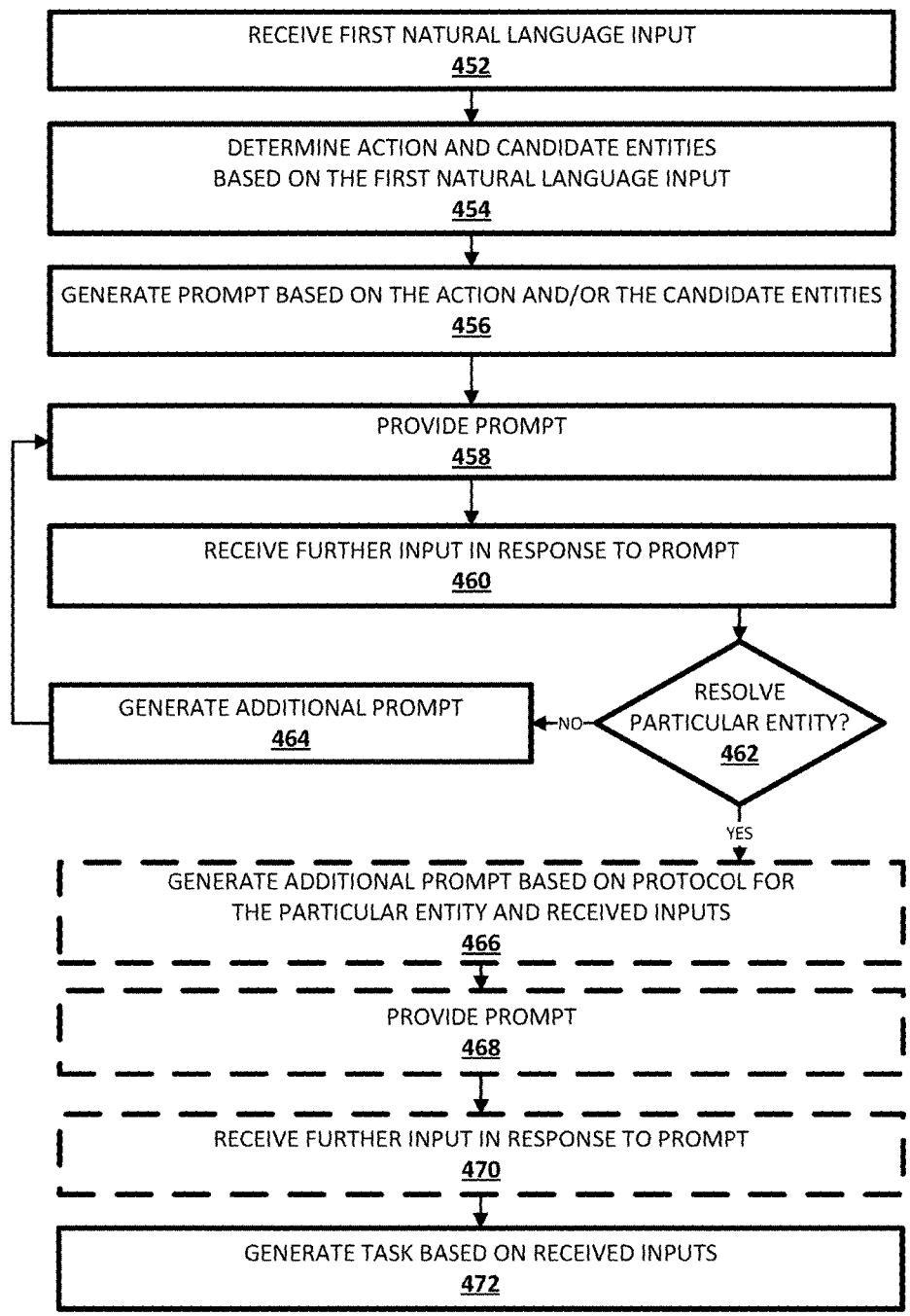
FIG. 4 is a flowchart illustrating an example method of engaging in a dialog with at least one user, via a computing device of the user, to determine a particular service entity for an action and a plurality of criteria for the action, and performing one or more computing actions based on the determined service entity and the one or more criteria for the action.

FIG. 4 is a flowchart illustrating an example method 400 of engaging in a dialog with at least one user, via a computing device of the user, to determine a particular service entity for an action and a plurality of criteria for the action, and performing one or more computing actions based on the determined service entity and the one or more criteria for the action. For convenience, the operations of the flow chart are described with reference to a system that performs the operations. This system may include various components of various computer systems, such as automated messaging system 120. Moreover, while operations of method 400 are shown in a particular order, this is not meant to be limiting. One or more operations may be reordered, omitted or added.

At block 452, the system receives first natural language input. The first natural language input may be free-form input formulated by a user via a user interface input device of a computing device of the user.

At block 454, the system determines an action and candidate entities based on the first natural language input. For example, the system may determine the action and a plurality of candidate service entities based on one or more terms of the first natural language input. In some implementations, the system may utilize an entity database and/or user attributes of the user that provided the first natural language input in determining the action and the plurality of candidate service entities.

At block 456, the system generates a prompt based on the action and/or the candidate entities determined at block 454. In some implementations, the prompt may be based on a protocol for the action and/or for the candidate entities. For example, the protocol may be associated with the action and/or the candidate entities and may define one or more desired and/or necessary parameters for achieving the action in association with the candidate entities. The system may utilize the parameters defined for the protocol in generating the prompt. For instance, the system may generate the prompt to solicit user input that provides criteria for one or more of the parameters.

At block 458, the system provides the generated prompt. The generated prompt may be provided for visual and/or audible presentation to the user via the computing device of the user.

At block 460, the system receives further input in response to the prompt. In some implementations, the further input may be free-form natural language input formulated by a user via a user interface input device of a computing device of the user.

At block 462, the system determines whether a particular entity can be resolved based on input that has been received. For example, the system may refine the candidate entities determined at block 456 in view of the further input received at block 460 to determine whether those candidate entities can be resolved to a particular entity.

If the system determines a particular entity cannot be resolved, the system proceeds to block 464 and generates an additional prompt. In some implementations, the additional prompt is based on the protocol optionally determined at block 456 and/or based on one or more of the candidate entities determined at block 454. For example, the system may generate the additional prompt to solicit one or more particular parameters for the protocol determined at block 456, in view of those particular parameters not being specified by the input received at blocks 452 and 460. In some implementations, the additional prompt is based on a refined group of candidate entities determined at block 462. For example, at block 462 the candidate entities determined at block 454 may be refined to a subset based on the input of block 460 and/or other factors. The additional prompt may be generated to include one or more properties (e.g., aliases) of the entities of the subset and to solicit further user input that specifies a particular entity of the subset and/or specifies a further subset of the subset.

After generating the additional prompt at block 464, the system then proceeds to blocks 458 and 460, then again determines at block 462 whether a particular entity can be resolved based on yet further input that has been received at the second iteration of block 460.

If the system determines a particular entity can be resolved at block 462 (either at a first iteration of block 462 or a subsequent iteration), the system proceeds to optional block 466 where the system generates an additional prompt based on a protocol for the particular entity and based on the received inputs. For example, the system may identify a specific protocol applicable to the particular entity and generate natural language output to solicit criteria for one or more parameters of that protocol that have not already been determined based on user input provided at block 452 or at any of the iterations of block 460.

At optional block 468, the system provides the prompt generated at block 466. At optional block 470, the system receives further input in response to the prompt generated at block 468. In some implementations, the system may determine at block 470 whether criteria for all of the parameters defined by the protocol for the particular entity can be determined based on the further input of block 470 and/or based on prior input of blocks 452 and 460. If criteria of one or more parameters cannot be determined, the system may perform one or more additional iteration of blocks 466, 468, and 470 to solicit further input and determine those parameters based on the further input.

At block 472, the system generates a task based on the inputs received in prior blocks. For example, the system may generate task that is associated with the user, identifies the determined action and the particular entity, and that includes the determined criteria for the action. In some implementations, the system may communicate the task to one or more other computing systems to initiate performance of the action by those computing systems and/or by one or more humans receiving user interface output from those computing systems.

Figure 5:
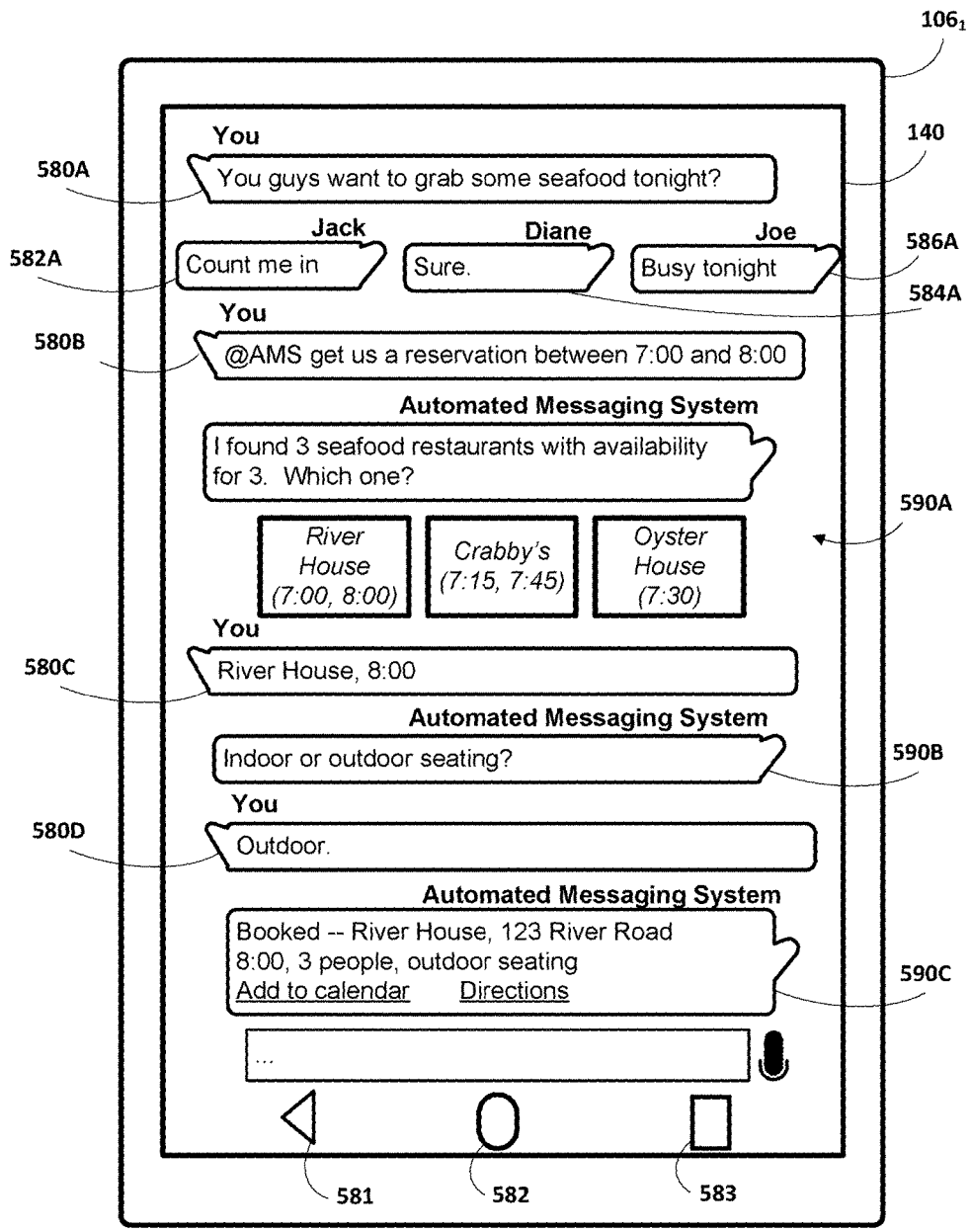
FIG. 5 illustrates an example client computing device of a user, with a display screen displaying an example of an ongoing message exchange between the user and additional users, and displaying a dialog that may occur between the user and an automated messaging system according to implementations described herein.
Figure 6:
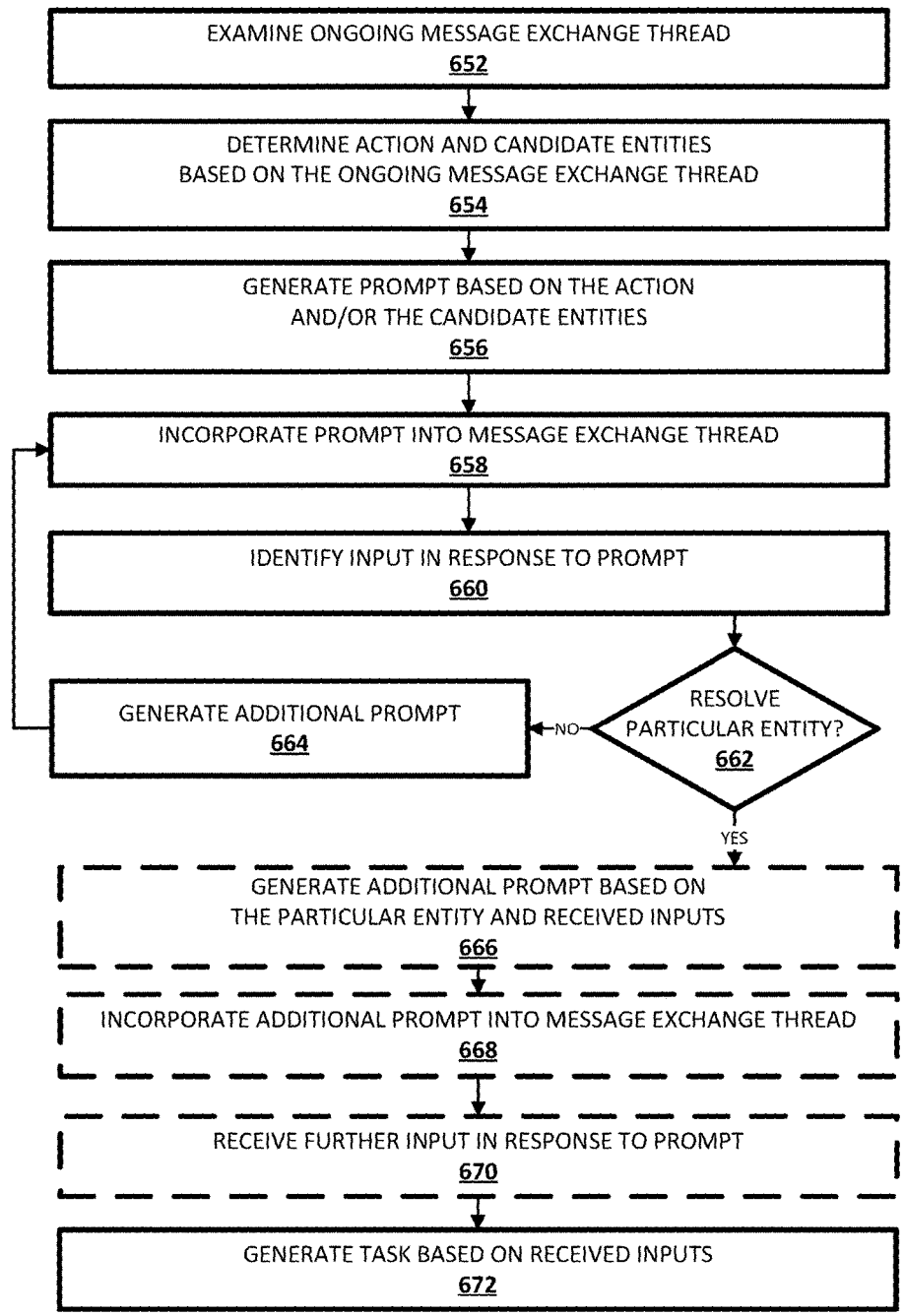
FIG. 6 is a flowchart illustrating an example method of engaging in a dialog with at least one user of multiple users engaged in an ongoing message exchange thread, to determine a particular service entity for an action and a plurality of criteria for the action, and performing one or more computing actions based on the determined service entity and the one or more criteria for the action.

As described herein, in some implementations techniques described herein may be implemented in ongoing message exchange threads between multiple users. Turning now to FIGS. 5 and 6, further description of some of those implementations is provided. For example, FIG. 5 illustrates the computing device 106₁ of FIG. 1 with a display screen 140 displaying an example of an ongoing message exchange thread between the user and additional users and displaying a dialog that may occur between the user of the client computing device 106₁ and the automated messaging system 120 according to implementations described herein. The display screen 140 of FIG. 5 also includes system interface elements 581, 582, 583 that may be interacted with by the user to cause the computing device 106₁ to perform one or more actions.

As described herein, in many implementations, one or more (e.g. all) of the prompts and/or other content generated by the automated messaging system 120 in FIG. 5 may be displayed or otherwise presented (e.g., audibly) as part of the message exchange thread to not only to the user via the computing device 106₁—but may also be displayed as part of the message exchange thread to other users of the message exchange thread via those users' computing devices. As also described herein, in many implementations, the other users of the message exchange thread may also provide input in response to prompts generated by the automated messaging system 120, and the automated messaging system 120 may generate further prompts and/or other content based on the input provided by the other users.

In FIG. 5, a user of the computing device 106₁ provides a message 580A in the message exchange thread and the message 580A, via the message exchange clients, is provided to corresponding message exchange clients of the other users in the message exchange thread ("Jack", "Diane", "Joe"). The other users respond to the message 580A with corresponding messages 582A, 584A, and 586A. The user of the computing device 106₁ then explicitly invokes the automated messaging system 120 in message 580B by inclusion of "@AMS" in the message. In other implementations, the automated messaging system 120 may be explicitly invoked via alternative user interface input and/or may engage in a dialog without explicit invocation (e.g., based on terms and/or other cues of the ongoing message exchange thread).

The message 580A further includes "get us a reservation between 7:00 and 8:00." In response, the automated messaging system 120 provides a prompt 590A for insertion in the message exchange thread, where the prompt 590A indicates that the automated messaging system 120 has identified service entities (restaurants) for the action (making a reservation) and has identified those service entities based on criteria determined from messages 580A, 582A, 584A, and 586A. The prompt 590A further prompts the user to select from the identified service entities ("Which one?") and presents graphical elements that show properties (aliases/names) of those service entities.

In some implementations, the entity determination engine 128 of the automated messaging system 120 may determine the service entities of prompt 590B based on analysis of the messages 580A, 582A, 584A, and 586A—and provide those service entities to message generation engine 130 for generation of the prompt by the engine 130 based on those service entities. For example, the entity determination engine 128 may determine entities that have a cuisine type property of "seafood" based on message 580A, that have availability between 7:00 and 8:00 based on message 580B, and that have availability at that time for three people based on determining that four users are included in the message exchange thread and that one of the users (Joe) provided a message 586A that indicates he will not be present. In some implementations, the entity determination engine 128 may utilize user attributes of one or more (e.g., all) of the users of the message exchange thread in determining the service entities. For example, the entity determination engine 128 may determine service entities that are within a threshold distance of a user location attribute for each of the users of the message exchange thread.

In response to the prompt 590B, the user of the computing device 106₁ provides further input 580C that specifies one of the entities ("River House") of the prompt 590B and specifies a time for the reservation ("8:00"). In some other implementations, another user of the message exchange thread may provide the further input. In yet other implementations, multiple users of the message exchange thread may provide further input and the automated messaging system 120 may determine a particular entity based on each of those inputs. For example, the automated messaging system 120 may select the particular entity indicated by the most inputs, or may select a particular entity that is "tied" with another in the inputs based on one or more criteria (e.g., based on the selected particular entity having a better rating, being closer to one or more of the users, etc.).

The automated messaging system 120 provides a further prompt 590B to solicit a choice between indoor and outdoor seating. In some implementations, the message generation engine 130 of messaging system 120 generates the prompt 590B based on a protocol that is specific to the "River House" entity and based on determining that protocol defines a parameter (e.g., "indoor or outdoor seating") that has not been specified by prior messages of the message exchange thread.

In response to the prompt 590B, the user of the computing device 106₁ provides further input 580D that specifies the criteria (outdoor seating) for the action. In some other implementations, another user of the message exchange thread may provide the further input. In yet other implementations, multiple users of the message exchange thread may provide further input and the automated messaging system 120 may determine a particular entity based on each of those inputs. For example, the user of the computing device 106₁ and/or another user in the message exchange thread may request that the automated messaging system 120 take a "vote", and the automated messaging system 120 may provide a prompt to the user of the computing device 106₁ and to Jack and Diane (but optionally not Joe since he indicated he will not be present) requesting the users to select between indoor and outdoor seating.

In response to the further input 580D, the automated messaging system 120 provides further content 590C that is a graphical element identifying that the reservation action has been completed ("Booked"), identifying the particular entity ("River House, 123 River Road") and identifying criteria for the reservation action ("8:00, 3 people, outdoor seating"). The further content 590C further includes deep links ("Add to calendar" and "Directions") that, when selected, will cause one or more additional computing actions to be performed that are specific to the particular entity and/or the criteria for the action. For example, selection of "Add to calendar" by one of the users may cause a computing device of the user to add an entry to the user's calendar that includes an alias of the particular entity and that includes the criteria for the action. Also, for example, selection of "Directions" by one of the users may cause a computing device of the user to open a mapping application with parameters to obtain directions from a current location of the computing device to "123 River Road".

Although FIG. 5 illustrates a particular example of implementing techniques described herein in an ongoing message exchange thread between multiple users, variations are possible. For example, in some implementations the automated messaging system 120 may engage in dialog with one or more users of an ongoing message exchange thread to resolve a particular entity for an action, without actively creating a task or performing a task related to that action and the particular entity. For example, in FIG. 5, in response to prompt 580C, the automated messaging system 120 may incorporate, into the message exchange thread, one or more properties of the particular entity, and one or more links (e.g., a deep link) that enable the users to select the link and perform the task via one or more separate applications and/or systems.

FIG. 6 is a flowchart illustrating an example method 600 of engaging in a dialog with at least one user of multiple users engaged in an ongoing message exchange thread, to determine a particular service entity for an action and a plurality of criteria for the action, and performing one or more computing actions based on the determined service entity and the one or more criteria for the action. For convenience, the operations of the flow chart are described with reference to a system that performs the operations. This system may include various components of various computer systems, such as automated messaging system 120. Moreover, while operations of method 600 are shown in a particular order, this is not meant to be limiting. One or more operations may be reordered, omitted or added.

At block 652, the system examines an ongoing message exchange thread between multiple users. The ongoing message exchange thread may be occurring between the multiple users via multiple message exchange clients of client computing devices of those multiple users. In some implementations, the system may examine the message exchange thread in response to an explicit invocation of the system. In some implementations, the system may examine the message exchange thread in response to one or more cues, such as cues from the message exchange thread itself. In some implementations, the system may examine the message exchange thread continuously or at a regular or non-regular interval.

At block 654, the system determines an action and candidate entities based on the ongoing message exchange thread. For example, the system may determine the action and a plurality of candidate service entities based on one or more terms present in one or more messages of the message exchange thread. In some implementations, the system may utilize an entity database and/or user attributes of one or more of the users engaged in the message exchange thread in determining the action and/or the plurality of candidate service entities.

At block 656, the system generates a prompt based on the action and/or the candidate entities determined at block 654. In some implementations, the prompt may be based on a protocol for the action and/or for the candidate entities. For example, the protocol may be associated with the action and/or the candidate entities and may define one or more desired and/or necessary parameters for achieving the action in association with the candidate entities. The system may utilize the parameters defined for the protocol in generating the prompt. For instance, the system may generate the prompt to solicit user input that provides criteria for one or more of the parameters. In some implementations, the prompt may be based on the candidate entities and may present one or more properties of a plurality of the candidate entities and/or prompt for a selection of one or more of the candidate entities by one or more of the users engaged in the message exchange thread.

At block 658, the system incorporates the prompt into the message exchange thread. The generated prompt is provided for visual and/or audible presentation to at least one of the users of the message exchange thread via the computing device of the user. In some implementations, the generated prompt is incorporated into the message exchange thread such that it is provided for presentation to multiple (e.g., all) of the users engaged in the message exchange thread. In some implementations, the system incorporates the prompt into the message exchange thread by requesting that at least one of the message exchange clients insert the prompt into a transcript of the ongoing message exchange thread that is displayed in a graphical user interface of the at least one of the message exchange clients.

At block 660, the system identifies further input in response to the prompt. The further input may be by one or more (e.g., all) of the users engaged in the message exchange thread. In some implementations, the further input may be free-form natural language input formulated by the user(s) via user interface input device(s) of computing device(s) of the user(s).

At block 662, the system determines whether a particular entity can be resolved based on input that has been received. For example, the system may refine the candidate entities determined at block 656 in view of the further input received at block 660 to determine whether those candidate entities can be resolved to a particular entity.

If the system determines a particular entity cannot be resolved, the system proceeds to block 664 and generates an additional prompt. In some implementations, the additional prompt is based on the protocol optionally determined at block 656 and/or based on one or more of the candidate entities determined at block 654. For example, the system may generate the additional prompt to solicit one or more particular parameters for the protocol determined at block 656, in view of those particular parameters not being specified by the input received at blocks 652 and 660. In some implementations, the additional prompt is based on a refined group of candidate entities determined at block 662. For example, at block 662 the candidate entities determined at block 654 may be refined to a subset based on the input of block 460 and/or other factors. The additional prompt may be generated to include one or more properties (e.g., aliases) of the entities of the subset and to solicit further user input that specifies a particular entity of the subset and/or specifies a further subset of the subset.

After generating the additional prompt at block 664, the system then proceeds to blocks 658 and 660, then again determines at block 662 whether a particular entity can be resolved based on yet further input that has been received at the second iteration of block 660.

If the system determines a particular entity can be resolved at block 662 (either at a first iteration of block 662 or a subsequent iteration), the system proceeds to optional block 666 where the system generates an additional prompt based on a protocol for the particular entity and based on the received inputs. For example, the system may identify a specific protocol applicable to the particular entity and generate natural language output to solicit criteria for one or more parameters of that protocol that have not already been determined based on user input provided at block 652 or at any of the iterations of block 660.

At optional block 668, the system incorporates the additional prompt generated at block 666 into the message exchange thread. The additional prompt may be incorporated for presentation to one or more of the users engaged in the message exchange thread. At optional block 670, the system receives further input in response to the prompt generated at block 668. The further input may be from one or more of the users of the message exchange thread. In some implementations, the system may determine at block 670 whether criteria for all of the parameters defined by the protocol for the particular entity can be determined based on the further input of block 670 and/or based on prior input of blocks 652 and 660. If criteria of one or more parameters cannot be determined, the system may perform one or more additional iteration of blocks 666, 668, and 670 to solicit further input and determine those parameters based on the further input.

Figure 7:
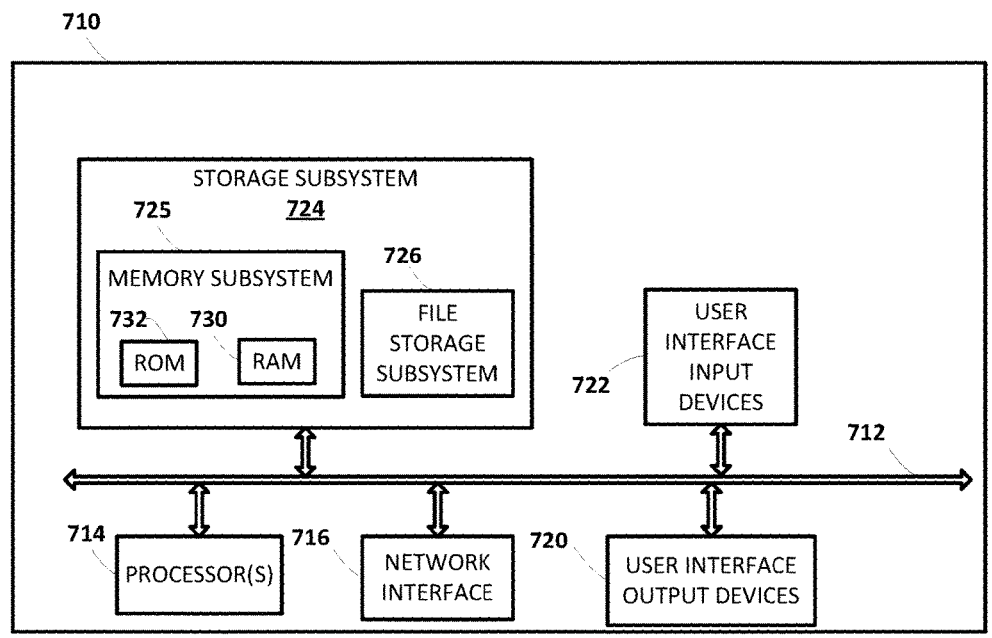
FIG. 7 illustrates an example architecture of a computing device.

At block 672, the system generates a task based on the inputs received in prior blocks. For example, the system may generate a task that is associated with at least one of the users of the message exchange thread, identifies the determined action and the particular entity, and that includes the determined criteria for the action. In some implementations, the system may communicate the task to one or more other computing systems to initiate performance of the action by those computing systems and/or by one or more humans receiving user interface output from those computing systems FIG. 7 is a block diagram of an example computing device 710 that may optionally be utilized to perform one or more aspects of techniques described herein. In some implementations, one or more of the client computing devices 160$_{1-N}$, automated messaging system 120, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716.

The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIGS. 4 and/or 6.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   receiving natural language input, the natural language input being:
      free-form input formulated by a user via a user interface input device of a computing device of the user as part of a dialog that involves the user and an automated messaging system;
   determining an action based on the natural language input;
   determining a plurality of candidate entities for the action, wherein the action can be performed by or for the candidate entities;
   identifying a stored general protocol for the action based on the general protocol being assigned to the action, the general protocol defining general protocol parameters;
   generating and providing one or more prompts as part of the dialog to solicit information directed to one or more of the general protocol parameters that are unspecified by the natural language input;
   resolving values for one or more of the general protocol parameters based on one or more inputs provided by the user in the dialog in response to the one or more prompts;
   resolving a particular entity of the candidate entities based at least in part on the resolved values;
   determining that a particular entity parameter is stored in association with the particular entity, and that the particular entity parameter is unresolved by the one or more inputs, the particular entity parameter being in addition to the general protocol parameters that are defined by the general protocol;

providing an additional prompt that is based on the particular entity parameter, the additional prompt provided in response to determining that the additional parameter is stored in association with the particular entity and is unresolved;

receiving, in response to providing the additional prompt, further input that is responsive to the additional prompt and that is provided by the user as part of the dialog;

determining, based on the further input, a particular value for the particular entity parameter; and communicating, to one or more computer systems, a task that identifies: the action, and the particular value for the particular entity parameter;

wherein communicating the task initiates performance of the action, by or for the particular entity, and initiates performance of the action with the particular value for the particular entity parameter.

2. The method of claim 1, wherein resolving the particular entity of the candidate entities based at least in part on the resolved values comprises:

identifying a subset of the candidate entities based at least in part on the resolved values, the candidate entities of the subset including the particular entity;

providing an entity selection prompt that solicits selection of one of the candidate entities of the subset; and resolving the particular entity based on an entity selection input provided by the user in response to the entity selection prompt.

3. The method of claim 1, further comprising:

determining that performance of the action, by or for the particular entity, is not achievable with the particular value for the particular entity parameter; and providing, for presentation to the user via the computing device, an indication that the action is not achievable by or for the particular entity.

4. The method of claim 3, further comprising:

in response to determining that performance of the action is not achievable, determining that the action is achievable, with the particular value, by or for an additional particular entity of the candidate entities; and providing, for presentation to the user via the computing device, a further indication that the action is achievable by or for the additional particular entity.

5. The method of claim 4, wherein the further indication is a selectable graphical element and further comprising, in response to selection of the selectable graphical element:

initiating performance of the action, with the particular value, by or for the additional particular entity.

6. The method of claim 1, wherein the action is a restaurant reservation action, and wherein the general protocol parameters include a date of a reservation, a time of the reservation, and a number of people for the reservation.

7. A method implemented by one or more processors, comprising:

determining an action based on natural language input formulated by a user as part of a dialog that involves the user and an automated messaging system, determining a plurality of candidate entities for the action, wherein the action can be performed by or for the candidate entities;

generating one or more prompts for providing as part of the dialog to solicit information directed to one or more parameters for the action that are unspecified by the natural language input;

resolving one or more values for one or more of the parameters based on one or more inputs provided by the user in the dialog in response to the one or more prompts;

resolving one or more particular entities of the candidate entities based at least in part on the resolved values;

generating, based on resolving the one or more particular entities, particular entity output for presentation to the user as part of the dialog, the particular entity output identifying one or more properties of a particular entity, of the one or more particular entities;

identifying, after providing the particular entity output for presentation to the user, a user selection of the particular entity;

in response to identifying the user selection of the particular entity, determining, through communication with one or more computing systems, that performance of the action with the resolved values is not achievable with the particular entity;

in response to determining that performance of the action with the resolved values is not achievable with the particular entity, determining that performance of the action with the resolved values is achievable for an additional particular entity of the candidate entities; and in response to determining that performance of the action with the resolved values is achievable for the additional particular entity:

generating additional particular entity output for presentation to the user as part of the dialog, the additional particular entity output identifying one or more additional properties of the additional particular entity.

8. The method of claim 7, further comprising:

identifying a user selection of the additional particular entity in response to presentation of the additional particular entity output;

initiating performance of the action, with the resolved values, by or for the additional particular entity.

9. The method of claim 8, wherein the additional particular entity output is a selectable graphical element.

10. The method of claim 7, wherein the action is a restaurant reservation action.

11. A system comprising:

one or more computing devices remote from a client device, and in network communication with the client device;

the one or more computing devices including memory storing instructions, and one or more processors executing the instructions to:

determine an action based on natural language input transmitted from the client device;

determine a plurality of candidate entities for the action, wherein the action can be performed by or for the candidate entities;

identify a stored general protocol for the action based on the general protocol being assigned to the action, the general protocol defining general protocol parameters;

generate one or more prompts that solicit information directed to one or more of the general protocol parameters that are unspecified by the natural language input;

transmit the one or more prompts to the client device;

resolve values for one or more of the general protocol parameters based on one or more user responses transmitted by the client device in response to the one or more prompts;

resolve a particular entity of the candidate entities based at least in part on the resolved values;

determine that a particular entity parameter is stored in association with the particular entity, and that the particular entity parameter is unresolved by the one or more inputs, the particular entity parameter being in addition to the general protocol parameters that are defined by the general protocol;

transmit, to the client device, an additional prompt that is based on the particular entity parameter, the additional prompt transmitted in response to determining that the additional parameter is stored in association with the particular entity and is unresolved;

receive, in response to transmitting the additional prompt, further input transmitted by the client device in response to the additional prompt;

determine, based on the further input, a particular value for the particular entity parameter; and store a task that identifies: the action, and the particular value for the particular entity parameter.

12. The system of claim 11, wherein one or more of the processors, in executing the instructions, are further to:

transmit the task to one or more additional computing devices to initiate performance of the action, by or for the particular entity, and initiate performance of the action with the particular value for the particular entity parameter.

13. The system of claim 11, wherein one or more of the processors, in resolving the particular entity of the candidate entities based at least in part on the resolved values, are to:

identify a subset of the candidate entities based at least in part on the resolved values, the candidate entities of the subset including the particular entity;

transmit, to the client device, an entity selection prompt that solicits selection of one of the candidate entities of the subset; and resolve the particular entity based on an entity selection input received in response to transmitting the entity selection prompt.

14. The system of claim 11, wherein one or more of the processors, in executing the instructions, are further to:

determine that performance of the action, by or for the particular entity, is not achievable with the particular value for the particular entity parameter; and transmit, to the client device, an indication that the action is not achievable by or for the particular entity.

15. The system of claim 14, wherein one or more of the processors, in executing the instructions, are further to:

in response to determining that performance of the action is not achievable, determine that the action is achievable, with the particular value, by or for an additional particular entity of the candidate entities; and transmit, to the client device, a further indication that the action is achievable by or for the additional particular entity.

16. The system of claim 15, wherein the further indication is a selectable graphical element and wherein one or more of the processors, in executing the instructions, are further to, in response to selection of the selectable graphical element:

initiate performance of the action, with the particular value, by or for the additional particular entity.

17. The system of claim 11, wherein the action is a restaurant reservation action, and wherein the general protocol parameters include a date of a reservation, a time of the reservation, and a number of people for the reservation.

* * * * *